J. G. Kimberlin.
Horse Hay Rake.
Nº 64,331 — Patented Apr. 30, 1867.
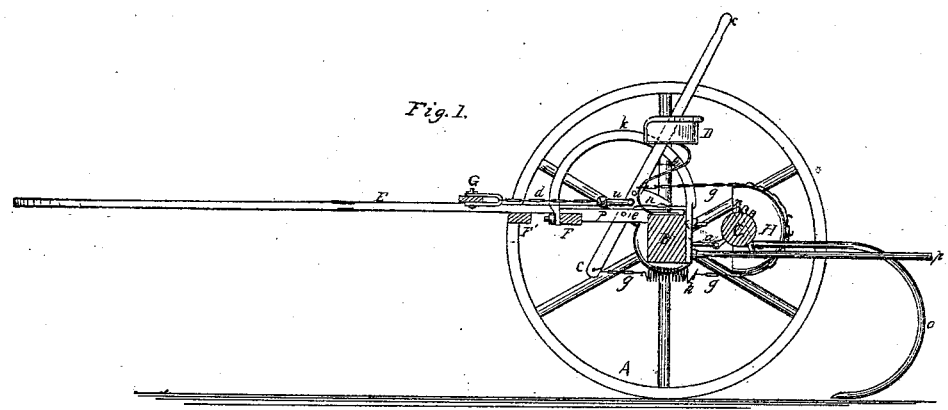
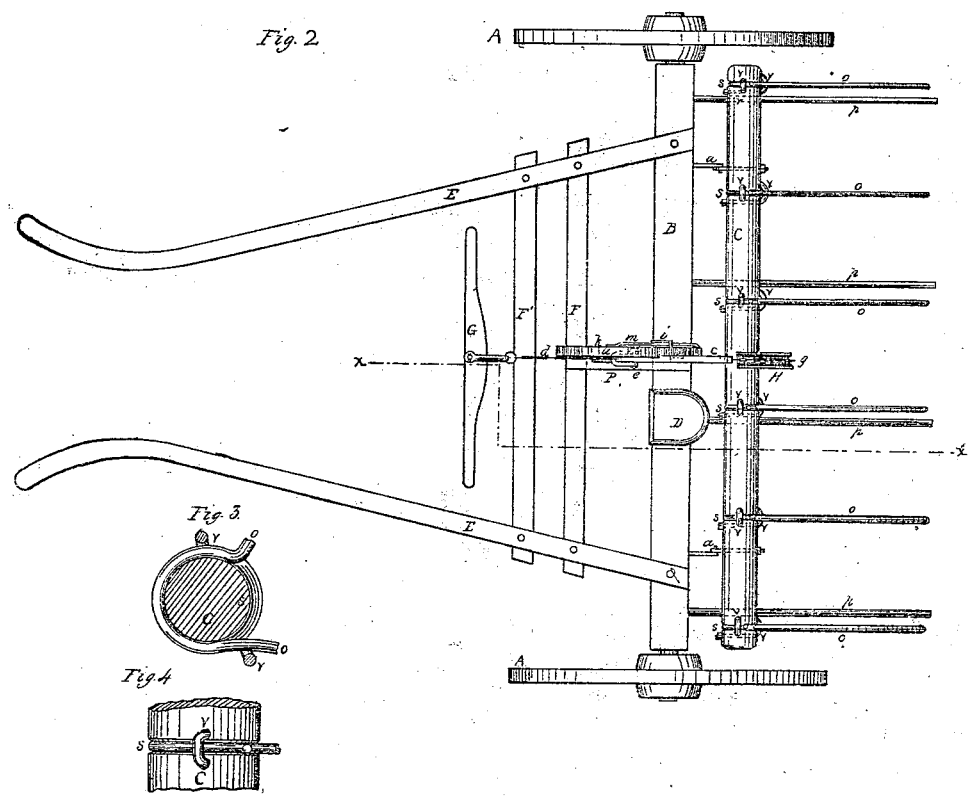
Witnesses:
Theo Tusch
J. Adrumes
Inventor:
J. G. Kimberlin
Per Warren
Attorney

United States Patent Office.

JOHN G. KIMBERLIN, OF DRYDEN, NEW YORK.

Letters Patent No. 64,331, dated April 30, 1867.

---

IMPROVEMENT IN HORSE HAY-RAKES.

---

*The Schedule referred to in these Letters Patent and making part of the same.*

---

TO ALL WHOM IT MAY CONCERN:

Be it known that I, JOHN G. KIMBERLIN, of Dryden, in the county of Tompkins, and State of New York, have invented a new and useful Improvement in Horse Hay-Rakes; and I do hereby declare that the following is a full, clear, and exact description thereof, which will enable others skilled in the art to make and use the same, reference being had to the accompanying drawings, forming a part of this specification, in which—

Figure 1 is a vertical longitudinal section of the rake of my invention, taken in the line $x\ x$, fig. 2.

Figure 2 is a top view of the same.

Figure 3 is a transverse section of the rake-head, showing the mode of connecting the rake-teeth.

Figure 4 is a side view of the same.

Similar letters of reference indicate like parts.

This invention relates to new and useful improvements in steel-wire toothed hay-rakes, and consists in the arrangement of a lever, in connection with the rake-head and the draught for unloading, and otherwise facilitating the working of the rake; and also in a novel mode of attaching the teeth to the rake-head, to secure them firmly in place without lateral movement, while they preserve their independent action vertically.

The construction of the frame is very simple. A A are the driving-wheels, and B the axle, behind which is suspended the rake-head C, on the pivots $a\ a$, for raising and lowering in the usual way. D is the driver's seat, mounted on the axle, a little on one side of the middle. E E are the thills, connected by the cross-bars or braces F F'. A small central beam, P, connects the axle B and the rear cross-bar F. The beam P is slotted vertically, for receiving a managing lever, $c$, which passes through the slot, and has its fulcrum at $e$, in the beam P. Above the fulcrum and the beam P, a draught chain, $d$, is attached by an adjustable clevis, $u$, to the lever $c$, which chain passes over the brace-bars F F', and connects with the whiffle-tree G. To the lower end of the lever $c$ is attached a lifting chain, $g$, which connects with a spiral spring, $h$, placed under the axle B, and hence runs to a segment guide-block, H, which is fastened on the rake-head C, and then passing forward over the axle B, is fastened to the lever $c$. The chain $g$ passes around a groove in the periphery of the segment guide, and is fastened to it for the purpose of holding and turning the rake-head, and lifting the teeth to unload when the managing lever $c$ is operated. The lever $c$ works alongside of a segmental iron guide-bar, $k$, extending from the rear of the axle B to the front of the cross-bar F, and the lever traverses on the guide-bar with a guide-loop, $i$. On the inside of the guide-bar $k$, at the back end, are two or more notches, which catch the lever when it is depressed to lower the rake-teeth to the ground, and in which it is held in place by means of a side spring, $m$, on the outside of the segment guide $k$. The lever $c$ has on it a stop projection, $n$, which bears on the axle B, and prevents excessive strain on the spring $h$, when the lever is depressed to lower the rake-teeth. The wire teeth $o\ o$ are attached in a novel manner to the rake-head, so that while they have a limited vertical play, they cannot move laterally. The upper end of the teeth $o\ o$ are bent, and fitted in circular grooves $s\ s$, turned in the rake-head C, passing through two staples, $v\ v$. One side of each of the staples passes through the rake-head and forms a bolt which is firmly secured in place by screw-nuts $u\ u$. The extremities of the rake-teeth are turned up a little to catch in the staple and hold them in place in the simplest possible way. Between the teeth are the clearing-bars $p\ p$, which project from the axle B under the rake-head C, and support it in the ordinary way.

It will be observed that the draught is directly upon the lever $c$, which is in a fixed position when the rake is at work, being held in place in the notch on the segment guide $k$ by the spring $m$. When the rake is filled with hay, it is unloaded by the release of the lever at the right hand of the driver, who gives it a slight side pressure. The draught pulls the lever forward, and lifts the rake instantly by means of the chain $g$, over the segment H. The draught is relieved when the hay drops, and the weight of the rake-head and teeth immediately brings the lever back to its place, where it is again secured in the notch on the segment guide $k$ by the spring $m$ to proceed with the work. The rake-teeth are held to their work on the ground by the lower part of the chain $g$, connected with the lower end of the lever $c$, while, at the same time, the spiral spring $m$ takes off the rigidity, and allows a little play to the rake-head to adapt it to unevenness of the ground.

Having described the construction of my invention, what I claim as new, and desire to secure by Letters Patent, is—

The continuous chain $g$, provided with an intermediate spring $h$, in combination with the lever $c$ and rake-head C, substantially as described for the purpose specified.

JOHN G. KIMBERLIN.

Witnesses:
    JAMES H. FOX,
    JOHN E. BERGEN.